May 8, 1962
R. E. DUNCAN ET AL
3,033,132
PROCESSING DOUGH
Filed Feb. 3, 1960
2 Sheets-Sheet 1
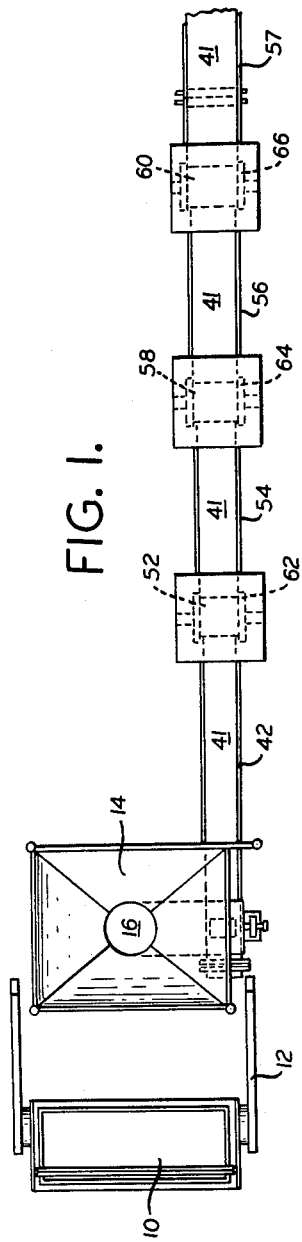
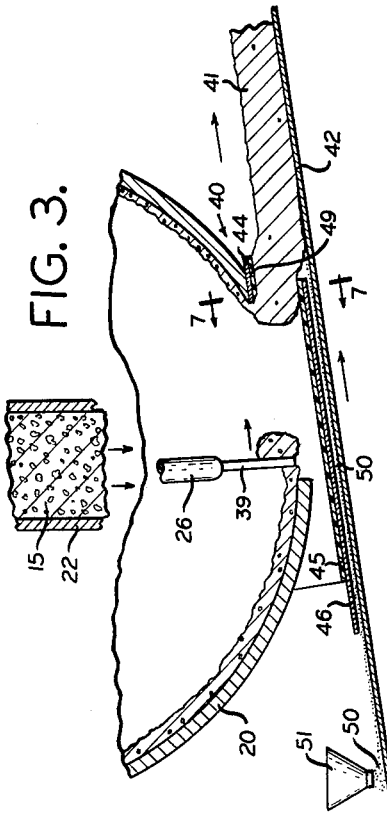
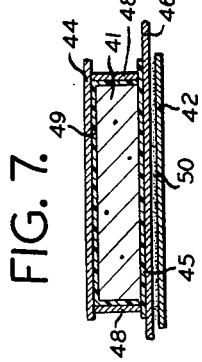
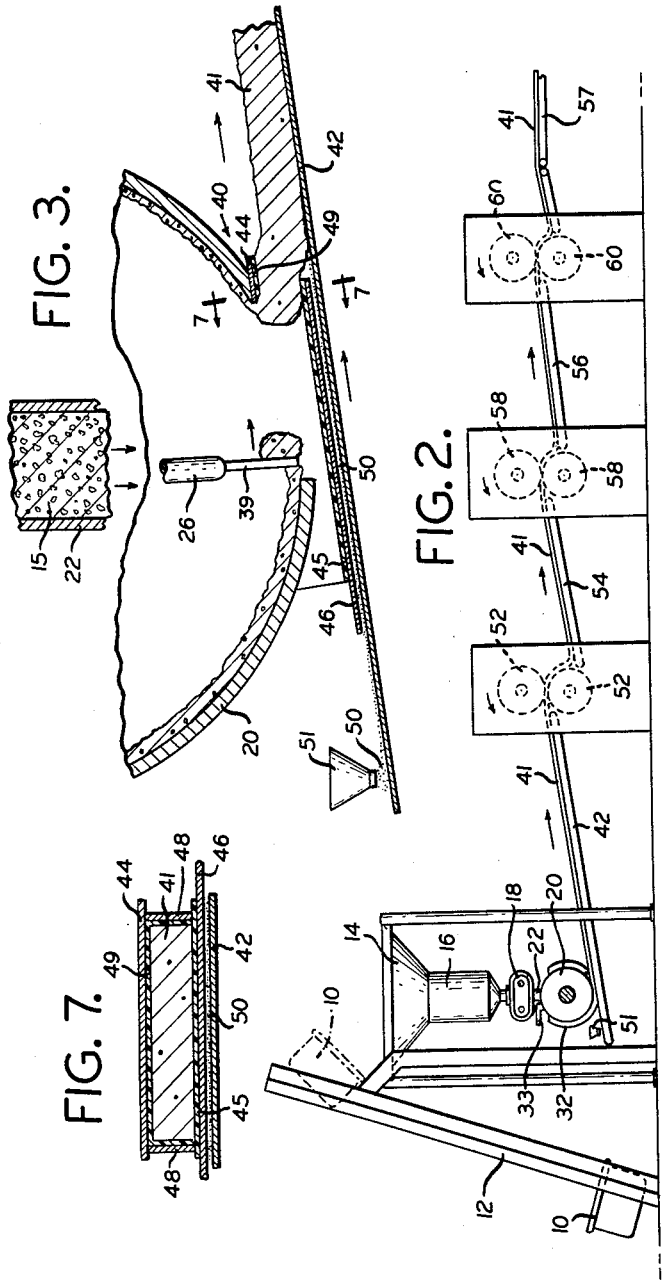
INVENTORS
ROBERT E. DUNCAN
ARTHUR B. EREKSON
BY *Robert Calvert*
ATTORNEY INVENTORS
ROBERT E. DUNCAN
ARTHUR B. EREKSON
BY *Robert A Calvert*
ATTORNEY

United States Patent Office 3,033,132
Patented May 8, 1962

3,033,132
PROCESSING DOUGH
Robert E. Duncan, Milltown, N.J., and Arthur B. Erekson, Scarsdale, N.Y., assignors to The Borden Company, New York, N.Y., a corporation of New Jersey
Filed Feb. 3, 1960, Ser. No. 6,443
3 Claims. (Cl. 107—54)

This invention relates to the preparation of cereal flour dough for baked goods such as bread and biscuits. The invention is particularly useful in making quickly, continuously, and economically a superior biscuit dough that is to be refrigerated and stored before use.

This application is a continuation-in-part of our co-pending application Serial No. 747,140, filed July 8, 1958, and now U.S. Patent No. 3,001,486, dated September 26, 1961.

Various processes for continuously making doughs for baked food articles have been unsatisfactory in the preparation of the bread dough and more difficult biscuit dough. In the case of biscuit dough it has been necessary heretofore to combine some and ordinarily all of the steps of forming the dough into a sheet, rolling, cross-rolling, lapping, and rolling the sheet again, the series of steps requiring considerable time and human effort. Our invention provides a continuous process that develops originally crumbly dough to good condition, with the protein in stretched, stringy form, with the air bubbles therein satisfactorily uniformly fine and evenly distributed, and of volume for unit of dry weight, or lightness, ordinarily above normal, all in a period which may be less than 30 seconds in contrast to minutes and much hand labor in the conventional processes. The invention forms the dough directly from this rapid and continuous developing operation into a strip of proper structure and thickness for either cutting into proper size for bread dough or for passage through automatic equipment for spreading the strip to desired width and final thickness for being cut into biscuits, with substantially no additional labor requirement.

The term "crumbly" is used herein to mean breakable into small pieces by bending and pulling, without substantial stretching.

Briefly stated, the invention comprises the herein described process for developing cereal flour dough by high speed kneading, mixing, and final stretching of the dough and consolidating the dough by centrifugal force, in such manner as to eliminate oversized bubbles of air and distribute satisfactorily evenly the remaining generally fine bubbles. In the preferred embodiment of the invention, the dough is thrown centrifugally against a restraining surface at the outlet of a cylindrical developer. With biscuit dough a bank of dough is moved from the surface and onto a conveyor belt which delivers the strip of dough so formed to a spreader in advance of the biscuit cutting and packing operations.

The biscuit dough is formed from a conventional cereal flour formula used for biscuits. A dough composition that is particularly satisfactory for our purpose is that described in U.S. Patent No. 2,942,988, a representative dough being of the following formula:

| Ingredient: | Parts by weight |
|---|---|
| Flour (wheat) | 100 |
| Shortening | 12.5 |
| Non-fat dry milk | 4 |
| Sugar | 4 |
| Salt | 2.5 |
| Water | 57–67 |
| Sodium acid pyrophosphate (SAPP-28) | 1.9 |
| Sodium bicarbonate | 2.1 |
| Fumaric acid | 0.4 |

The last three components constitute the leavener.

The undeveloped dough may be formed by mixing in a conventional mixer prior to being advanced to the developer or the dough ingredients may be added directly to the developer where they are mixed, formed into a dough, and the dough is then developed.

The flour used has a protein content of about 11.5% on the dry basis and moisture 14%. The proportion of total water in the formula is about 57–67 parts for 100 of flour on the as received basis.

The sodium acid pyrophosphate used has an equivalent weight as an acid of 111. That is, 222 parts are required to correspond to 1 mole (116 parts) of the fumaric acid.

The particle sizes of the acidic materials as introduced into the mix are as shown in the following table of screen tests:

| Screen, meshes per linear inch | Acid component, cumulative percent | |
|---|---|---|
| | Pyro-phosphate | Fumaric acid |
| On 40 | 0 | 0 |
| On 50 | | 12 |
| On 60 | Trace | 26 |
| On 70 | | 53 |
| On 100 | 0.2 | 86 |
| Through 100 | | 14 |
| On 200 | 6 | |
| Through 200 | 93.8 | |

It is important that the proportion of water in the dough should be such as to make the dough originally crumbly but stretchable under high speed mixing and kneading in the development step. The proportion of water should be sufficient to cause the dough, during and after development, to cohere when a mass of the dough is hurled against other portions of the dough. The proportion of water, on the other hand, must be below that which would make the dough excessively flowable or too sticky to handle in subsequent biscuit cutting and canning.

A suitable bread dough is made of the following conventional formula:

| Ingredient: | Parts by weight |
|---|---|
| Flour (wheat) | 100 |
| Water | 65 |
| Yeast | 2 |
| Yeast food | 0.25–0.50 |
| Malt | 0.5 |
| Salt | 2 |
| Sugar | 6 |
| Skim milk solids | 6 |
| Shortening | 4 |

A brew is formed by mixing together sugar, the yeast, yeast food, and water and allowing the mixture to ferment to develop the alcohol and other flavoring material caused by yeast fermentation.

This brew is then added to the remaining ingredients and the mass is thoroughly mixed to form an undeveloped dough which is advanced to a developer as described later herein.

Alternatively the brew and other bread dough ingredients may be added directly to the developer. In the developer the ingredients are mixed to form a bread dough which is then developed.

Suitable apparatus for carrying out the invention will be described in connection with the preparation of a developed biscuit dough.

FIG. 1 is a plan view of the machine for developing the dough and delivering it in strip form to subsequent processing.

FIG. 2 is a side view of the same equipment.

FIG. 3 is a sectional view on an enlarged scale of part of the equipment of FIG. 2.

FIG. 7 is a sectional view on line 7—7 of FIG. 3.

Figure 4:
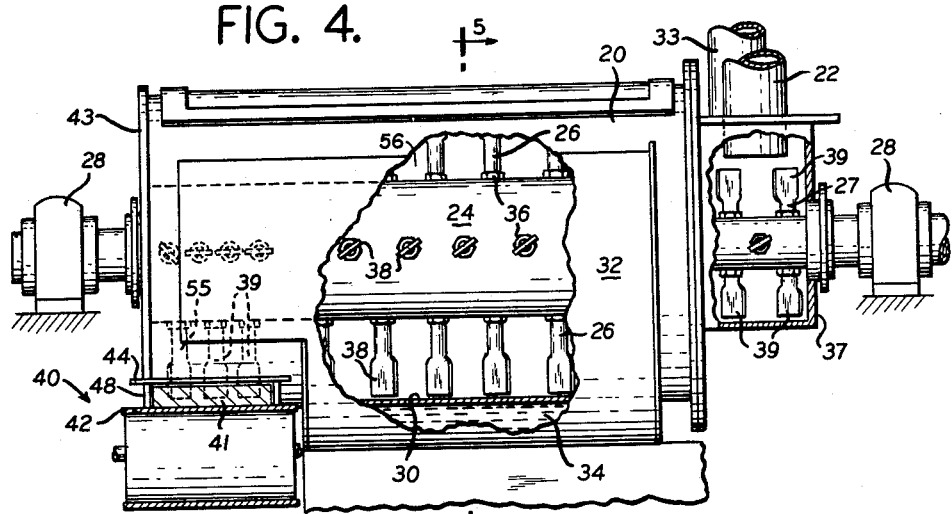
FIG. 4 is a front view, partly broken away for clearness of illustration, of the developer and the assembly below the outlet thereof.
Figure 5:
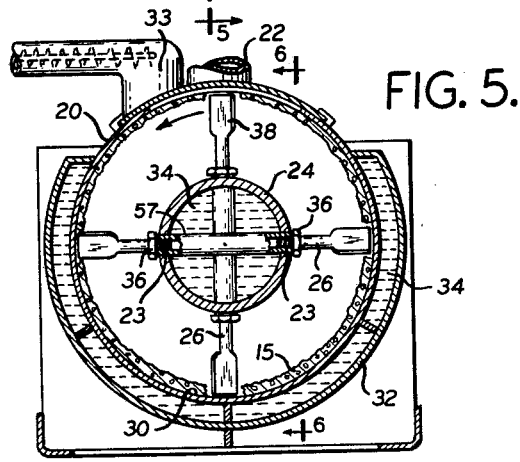
FIG. 5 is a sectional view on line 5—5 of FIG. 4.

Parts not shown in detail are conventional and the various views are in part diagrammatic.

There are shown the trough 10 for delivery of the dough to hopper 14 by lifting mechanism 12, both the trough and the lifting mechanism being of a type usual in this industry. The feed hopper 14 delivers the dough 15 through outlet 16 with vertical walls to metering pump 18 of a type known as a positive pump, the particular one here used being the Waukesha. The developer 20 includes a dough inlet section 37, and a main section 56 with rigid wall and receives the dough from the pump through feed pipe 22. A hollow shaft 24 extends through the developer 20 and is of larger cross-sectional area in cylindrical section 56 than in the dough inlet section 37. Mixing elements 26, ordinarily with blade ends 38 and threaded ends 23, are attached to the shaft by screwing the threaded ends 23 into threaded tubular members 57 which extend through the hollow shaft 24. Conventional drive mechanism 28 rotates at high speed the shaft and the attached mixing elements arranged in four series 90° apart. The mixing ends or plates of the said elements move close to the inner surface 30 of the said container, as within 0.04–0.3 inch of the said surface, usually about $\frac{1}{16}$ inch. The overall length of blades 39 and mixing elements 27 in the dough inlet section 37 is less than for parts 38 and 26.

The container is provided with jacket 32 for holding a cooling fluid 34 and the shaft 24 is hollow for receiving the same cooling fluid. Inlet 33 is for dry flour.

Figure 6:
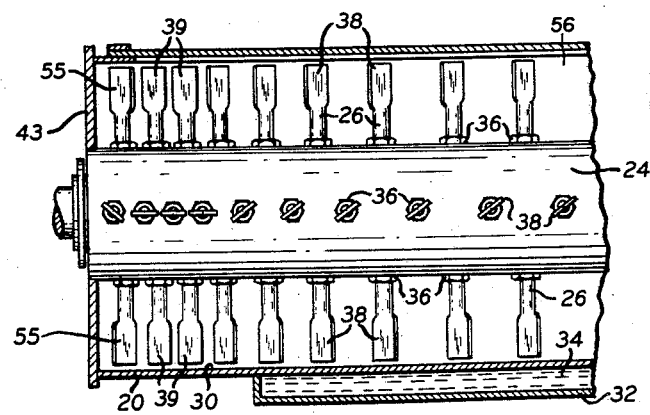
FIG. 6 is a sectional view on line 6—6 of FIG. 5.

The means mounting the mixing elements 26 to the shaft include stops such as the lock nuts 36 for controlling the angle of the faces of the blades with respect to the shaft. In the preferred embodiment of the invention, the mixing elements 26 are screwed into the tubular members 57 so that the faces of most of the blades are at an angle to the longitudinal axis of the shaft. The lock nuts 36 are then tightened to maintain the blades in this position. In this angular position the blades not only knead and mix the dough but also work it towards the outlet, at the left in FIGS. 4 and 6. The angle may be varied, as from 20°–65°, a suitable setting being about 30°–55°.

The blades 39 which register with the outlet 40 are, however, approximately parallel to the axis, so that these blades 39 throw the dough with maximum force through the outlet. The outermost blade 55 (FIGS. 4 and 6) are tilted in a direction opposite that of blades 38, to avoid accumulation of the dough on the outlet end of the developer.

At its outlet, the developer wall is cut away at one end, as illustrated generally at 40.

Below this outlet is conveyor 42, ordinarily the upper reach of a conveyor belt moving to the right in FIGS. 1, 2, and 3, in the direction in which the masses of dough are thrown by the blades 39 and 55 through the said outlet.

Disposed above the conveyor belt is a plate 45 supported by another plate or part 46, which in turn is supported a short distance above the upper reach of the conveyor 42 by suitable means such as the feet 48. The plate 45 is adapted to receive the dough after it is thrown through the outlet 40 onto the conveyor and to permit the dough, because of the centrifugal force with which the dough is delivered and the bombardment by subsequent masses of the dough, to slide from the plate forwardly as a strip 41 onto the conveyor 42. The spacing of the plate 46 a short distance, such as a fraction of an inch, above the conveyor 42 provides a space 50 for passage of rice flour or like dough release dust applied by a conventional powder sifting device 51 to the upper reach of the conveyor before it reaches the position of receiving the dough. The overlying plates 45 and 46 prevent this anti-sticking flour from being blown away by the blast of air that issues from the outlet of the developer.

An anti-friction plate 49 forms in effect a doctor blade for establishing the level of the upper surface of the dough strip 41. It is backed by plate 44, both parts 49 and 44 being mounted by usual means, not shown.

The conveyor 42 delivers the dough strip 41 to the bite between the rollers 52. Other conveyors 54 and 56 deliver the material to the additional rollers 58 and 60 and finally to conveyor 57.

These rollers 52, 58, and 60 are three pairs of spreader rollers for widening the strip of dough and establishing eventually the proper width and thickness of the sheet. These rollers themselves increase in width from left to right, as illustrated in FIG. 1. One of each pair of rollers has an annular shoulder 62, 64, or 66 at each end. This shoulder prevents the dough from flowing outwardly over the edge of the conveyor belt or to a sheet of width greater than desired at any spreading stage. In the construction shown, the confining shoulders are on the upper rollers of the several pairs.

There is no need to pass bread dough through rollers. Bread dough can be divided and panned as it leaves the plate 45. The pans may be placed on the conveyor 42 in which case there would be a greater distance between the plate 45 and the conveyor. Alternatively the dough may be divided as it leaves the plate 45 and dropped onto conveyor 42 for transfer to a rounder and molder (not shown).

The materials of construction of the various parts of the machine are those that are used for like parts in machines of this general type, except as noted to the contrary.

Suitable materials for the major structural parts are steel, stainless steel, tinned iron or steel, or Monel metal. Non-corrosive material is desirable for all parts of the machine that contact the dough. Stainless steel is particularly satisfactory for the trough, hopper, pump, developer parts, and the subsequent spreading rollers.

All conveyors are formed of suitable natural or GRS rubber conveyor belts including the usual fibrous or metal reinforcement. Woven cotton belts are satisfactory.

The plates 45 and 49 are constructed of a material that is non-corrosive and suitably shows low or substantially no adherence to the dough, so that the dough, thrown forward, moves off this plate rapidly and against the back edge of the strip of dough 41. Plastic materials that are firm and strongly hydrophobic and low in friction coefficient are particularly satisfactory for the composition of this plate, examples being Teflon (polytetrafluoroethylene), nylon and polymethylmethacrylate, all in molded sheet form with smooth upper surface.

The cooling fluid 34 is any liquid of satisfactory heat absorbing capacity and suitably nontoxic. Examples of such materials that may be used are aqueous solutions of propylene glycol, glycerine, polypropylene, or polyglycerine. The propylene, as in a 40% solution in water, is preferred.

Dimensions of the various parts are varied in accordance with the output desired. For large scale commercial production we have used a cylindrical developer of 20 inches diameter and 3 feet long. The outlet from this chamber, shown at the lower left in FIG. 4, is approximately 8 inches long and 7 inches wide, the opening at the back side (to the left in FIG. 3) being just far enough above the plate 44 to allow for escape of the air current above plate 45. At the forward side (to the right in FIG. 3), the clearance above the upper surface of the conveyor is 0.5–4 inches and ordinarily about 1.5 inches. In connection with the doctor blade 44, with underliner 49 of one of the low-friction plastics stated, this edge controls the thickness of the dough strip formed.

The width of the blades 38, 39, and 43 may be varied as from about 0.5 to 4 inches in width. We find particularly good results when the blades are about 1–2 inches wide.

The operation of the machine and the process will be largely evident from the description that has been given.

The dough is first mixed in a conventional mixer such as a Day dough mixer (not shown). It is then filled into the trough 10.

The resulting originally somewhat crumbly dough, delivered by the trough, falls through the hopper and through the delivery spout 16 therefrom to the pump 18. This metering positive pump creates such suction and the consistency of the dough is such that it is sucked into the pump and fed therefrom at a predetermined rate continuously into the developer through the pump outlet line 22 of about 4 inches diameter. Here it is repeatedly kneaded and stretched by the numerous impacts of the blades.

Alternatively the dough ingredients may be added directly to the developer, as set forth above, and the action of the blades mixes the ingredients, forms the dough, and develops the dough.

The shaft 24 and the attached stems 26 and blades 38, 39, and 43 are rotated at high speed such as about 550 revolutions per minute although speeds as low as 300 may be used somewhat less satisfactorily and speeds of 1,000 r.p.m. somewhat less conveniently. In general, we rotate the shaft 24 and attached elements at such speeds that the blades, at their outer ends, have a linear speed of approximately 2,000–5,000 feet a minute, and in our commercial developer a speed of about 2,000–3,000 feet a minute. Dough under the impact of the blades moves at such speeds with respect to adjoining, momentarily stationary dough.

As a result of this rotation, there is high speed kneading and stretching action of the blades on the dough. A given portion of the dough is subjected to a sudden high speed blow of a blade which stretches the dough and particularly the protein therein as the dough, under the impelling force of the blade and the coherence, momentarily at least, to stationary portions of the dough. The dough comes quickly to have the desired stringiness for use in making biscuits or the like. In fact, the entire development of the dough to this desired condition occurs in a period of time that averages about 4–30 seconds from the time of introduction through the inlet 22 to delivery to conveyor 42.

Masses of the dough ploughed up by the blades may be temporarily moved inward for a short distance and then hurled by centrifugal force against a surface of the developer or against other dough forming a lining therewithin.

Also large air bubbles that are very conspicuous, in the dough as introduced through inlet 22, disappear in this 30 seconds or so of development. Only a small proportion of very fine bubbles remain.

In starting up the machine it is customary to hold a clean board or other material as a dam (not shown) across the conveyor 42 near the outlet from the developer so that the dough, thrown in masses by the blades 39 and 43, strike the damper and build up a layer of the accumulated dough such as shown in FIG. 3. Then the dam is removed so that subsequent masses of the dough thrown through the outlet strike the rear edge of this previously started sheet 41 of dough. The strip 41 so formed is then widened and correspondingly thinned by passage between the pairs of rollers 52, 58, and 60 for delivery to the final conveyor 57. This conveyor leads to a cutting and packing machine for the biscuit blanks, such, for example, as the machine described in U.S. Patent No. 2,899,787.

To offset the heating effect of the high speed mixing in the developer, cooling liquid is pumped through the jacket 34 and through the hollow shaft 24 at such rate as to hold the temperature of the dough within the range 55°–80° F. At lower temperatures, the rate of development is objectionably retarded. At temperatures above 80° F., there is deterioration of quality as shown in the finished baked goods. Ordinarily we operate at a dough temperature of 65°–70° F.

The proportion of water used in the biscuit dough, to give the proper flow properties thereto, will vary somewhat with the flour used. For an average grade of wheat flour containing 11.5% protein and 14% of moisture, we use to advantage about 60–62 pounds of water for 100 pounds of the flour of moisture content stated. With other flours, we may vary the proportion of water within the range 57–67 pounds for 100 pounds of the flour used. In any case, the amount of water used is such that the dough will enter the pump in the set-up shown in FIG. 2 under the influence of gravity and the suction created by the pump. On the other hand, the proportion of water is less than that which, if used, would make the dough so soft as to collapse with the elimination of all of even the finest air bubbles under the influence of the centrifugal throwing to which it is subjected in our process or so soft as to be too sticky to be handled by the fingers or by mechanical devices during packing of the biscuit cut-outs.

A suitable test for proportion of water in the biscuit dough is the rate of flow. In making this test, a bread pan of about 3 inches depth and suitably about 9 inches long by 5 inches wide is filled with the dough. This is then inverted and the dough so delivered onto the upper surface of an emery paper, the emery paper being used to avoid subsequent slipping of the mass of the dough and the emery paper in turn being supported by a rigid plate of steel or the like. The plate is then elevated at one end to an angle of 35° from the horizontal. The rate of flow of the dough at this angle is then noted. Doughs that are satisfactory in our process and with our machine, when maintained at this angle, will flow approximately 0.5–3.5 inches a minute at a dough temperature of 80° F. We obtain particularly good results when the rate of flow under these conditions is about 2–3 inches per minute.

We have found advantageous, in commercial operations, the addition of a part of the flour after the dough passes through the pump 18 on the way to the developer. In this procedure we facilitate delivery of the dough by the said pump. Then we add the remainder of the flour continuously to the dough in the developer 20, as by the screw feed in inlet 33 into the feed end of the developer. The additional dough has some drying up and stiffening effect on the dough in the subsequent processing steps. In this way we obtain satisfactory handling of the dough by the said pump and also prevent objectionable sticking of the dough to the developer walls, spreading rollers 52, 58, and 60, or other parts of the equipment to the right of the developer 20 in FIG. 2. A suitable proportion of the flour which is withheld from the dough as delivered by the troughs 10 and then introduced into the developer 20 is 10%–35% of the total flour used and for best results about 15%–25%.

Other cereal flours may be used less satisfactorily, including potato, rice, or corn, alone or mixed with each other or with wheat flour. As to shortenings, the conventional bakery shortenings such as lard and hydrogenated vegetable oils may be employed.

Other shapes and articles may be made including rolls, cakes, and the like, the dough composition used being varied for the alternative articles in accordance with known technique.

It will be understood that it is intended to cover all changes and modifications of the examples of the invention herein chosen for the purpose of illustration which do not constitute departures from the spirit and scope of the invention.

We claim:

1. In making a developed cereal flour dough for baking, the process which comprises subjecting the undeveloped dough in moistened originally crumbly condition to repeated high speed kneading and stretching in a confined area, expelling separate successive portions of the kneaded and stretched dough centrifugally from said area against a mass of previously expelled dough to move by force of impact said previously expelled dough forward as a unitary mass and to remove objectionably large air bubbles from the developed dough.

2. In making and sheeting a developed cereal flour dough comprising approximately 57–67 parts of water for 100 of flour, the process which comprises making a wet mix of the said water and approximately 65%–90% only of the total weight of the flour, then introducing and mixing the remainder of the flour, subjecting the resulting undeveloped dough to repeated high speed kneading and stretching, expelling separate successive portions of the kneaded and stretched dough centrifugally against a mass of previously expelled dough to move by force of impact said previously expelled dough forward as a unitary mass and to remove objectionably large air bubbles from the developed dough, forming the dough into a sheet, and then rolling the sheet into a wider and thinner sheet, the introduction of the flour in two portions causing the mix first made to be softer than the dough after introducing the said remainder of the flour.

3. A continuous method of making a developed baking powder biscuit dough comprising continuously forming separate successive portions of a crumbly undeveloped dough mass comprising 57 to 67 parts of water for every 100 parts by flour, continuously subjecting said separate successive portions of undeveloped dough to repeated high speed kneading and stretching in a confined area, and continuously expelling the successive portions of kneaded and stretched dough centrifugally against a mass of previously expelled dough to move by force of impact said previously expelled dough forward as a unitary mass and to remove objectionably large air bubbles from the developed dough, said kneading being carried out while the dough is maintained at a temperature within the range 55°–80° F.

References Cited in the file of this patent

UNITED STATES PATENTS

| | | |
|---|---|---|
| 617,866 | Somasco | Jan. 17, 1899 |
| 774,680 | Lynds | Nov. 8, 1904 |
| 1,686,967 | Harher | Oct. 9, 1928 |
| 2,357,085 | Cohen et al. | Aug. 29, 1944 |
| 2,547,566 | Cohoe | Apr. 3, 1951 |
| 2,670,937 | Truesdell | Mar. 2, 1954 |
| 2,868,143 | Strahmann | Jan. 13, 1959 |
| 2,868,144 | Ambrette | Jan. 13, 1959 |
| 2,873,697 | Strahmann | Feb. 17, 1959 |
| 2,920,964 | Oakes | Jan. 12, 1960 |